Jan. 31, 1967  J. J. SMITH  3,301,051
BY-PASS FLUID METER FITTING
Filed Feb. 3, 1965  2 Sheets-Sheet 1

INVENTOR
JOHN J. SMITH
BY Cushman, Darby & Cushman
ATTORNEYS

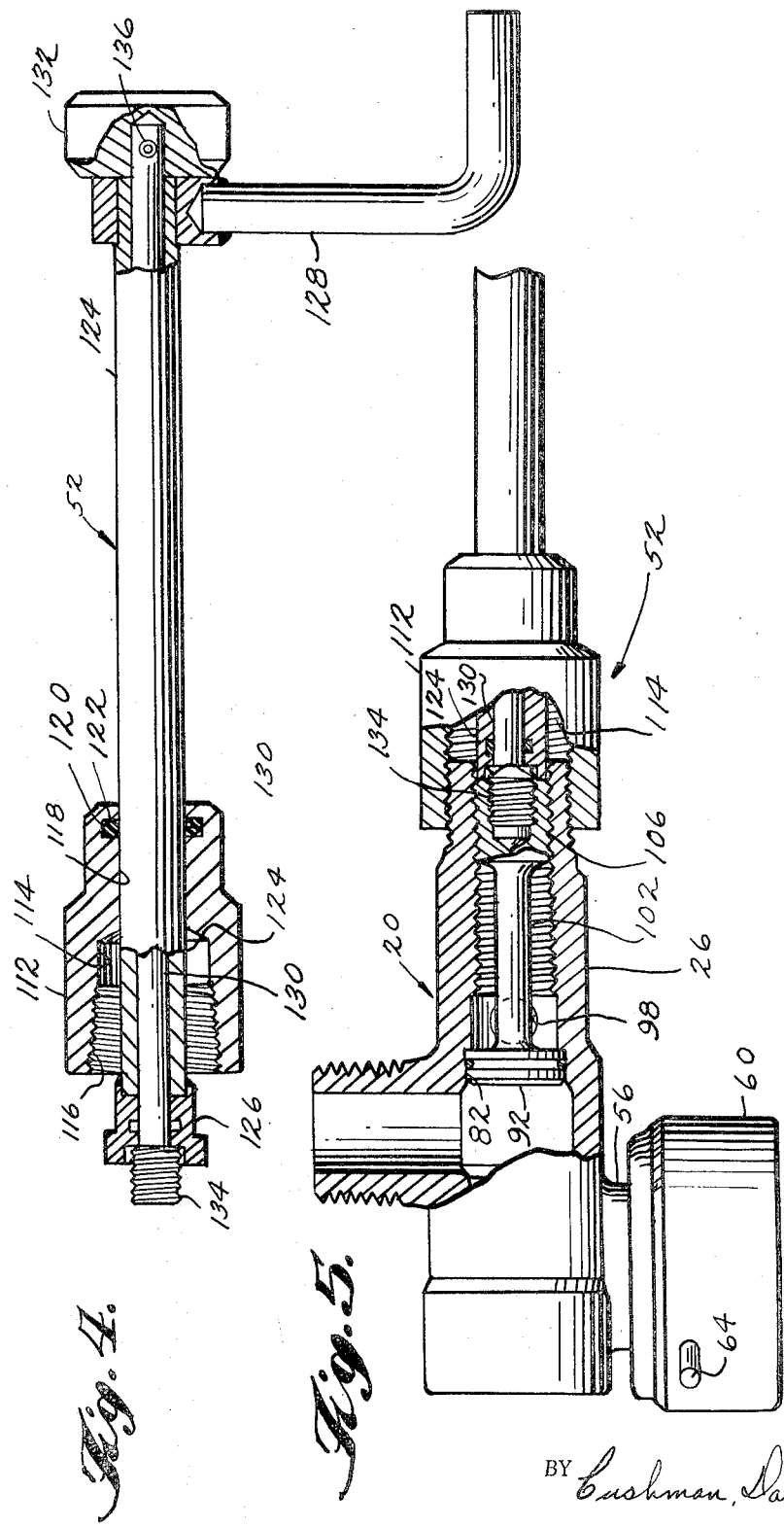

United States Patent Office 3,301,051
Patented Jan. 31, 1967

3,301,051
BY-PASS FLUID METER FITTING
John J. Smith, Decatur, Ill., assignor to Mueller Co., Decatur, Ill., a corporation of Illinois
Filed Feb. 3, 1965, Ser. No. 430,137
12 Claims. (Cl. 73—201)

The present invention relates to an improvement in by-pass fluid meter fittings and, more particularly, to an improved by-pass fitting for use in either the inlet or outlet or in both the inlet and outlet of a fluid meter.

It is an established practice among many gas utility companies to remove, inspect, clean, repair, and replace their gas meters after the latter have been in service for a period of time. Some meter settings now currently used by the gas utility companies are provided with by-pass means so that when the gas meter is removed from service or replaced, gas service to gas appliances of the dwelling or the like is not interrupted. By providing by-pass means on the meter settings so that there is no interruption of service, the pilot lights to gas appliances in the dwelling or building are not extinguished and the people of the dwelling or building do not have to be disturbed by service personnel traveling back and forth within the dwelling. In many instances, the prior systems of by-pass type meter settings fall short in that they can cause interruption of fluid service by a fluid surge at some time during the replacement, thus extinguishing pilot lights. Additionally, such prior systems require a number of expensive different special parts, and are too cumbersome and difficult to operate. Also, such prior settings require considerable space for installation on the fluid meters and, therefore, cannot be employed in confined areas, and further are not of a tamper proof construction.

An important object of the present invention is to provide an improved by-pass meter fitting which may be used as an economical new installation for a meter setting or as a replacement installation when the meter is changed thus enabling an old installation to be modernized quickly, conveniently and inexpensively.

Another object of the present invention is to provide an improved by-pass fluid meter fitting which may be used either in the inlet line of a fluid meter or in the outlet line of a fluid meter or both in the inlet and outlet line of the fluid meter.

Ancillary to the immediate preceding object, it is still another object of the present invention to provide an improved by-pass fitting for fluid meters which is tamper proof in construction and in operation and thus can be serviced or used only by authorized personnel of the gas utility companies.

A further object of the present invention is to provide an improved by-pass fluid meter fitting which is compact in design thus reducing the over-all space of a meter setting, the fitting when installed upon a fluid meter being easy to operate by authorized personnel when a by-pass operation is desired.

Still another object of the present invention is to provide an improved by-pass type meter setting utilizing the improved by-pass fittings, the setting being capable of operation by persons of limited skill with a minimum of instruction and auxiliary equipment.

Yet another object of the present invention is to provide an improved by-pass type meter setting that utilizes substantially identical fittings for both the inlet and outlet lines of the fluid meter, the fittings being simple in construction with resulting economies of manufacture and installation.

These and other objects and advantages of the present invention will be more clearly understood and appreciated from the following detailed description in the specification, the claims and the attached drawings, wherein:

Figure 2:
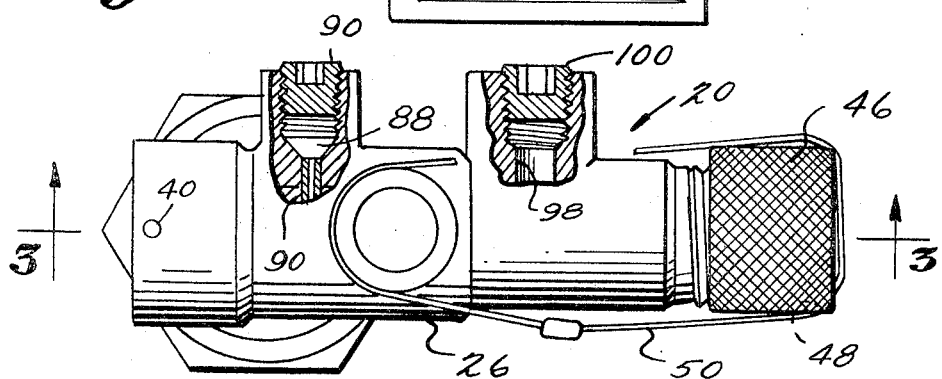
FIGURE 2 is a top plan view of one of the improved by-pass fittings for the fluid meter setting disclosed in FIGURE 1, the view being partly broken away for the purpose of clarity.
Figure 3:
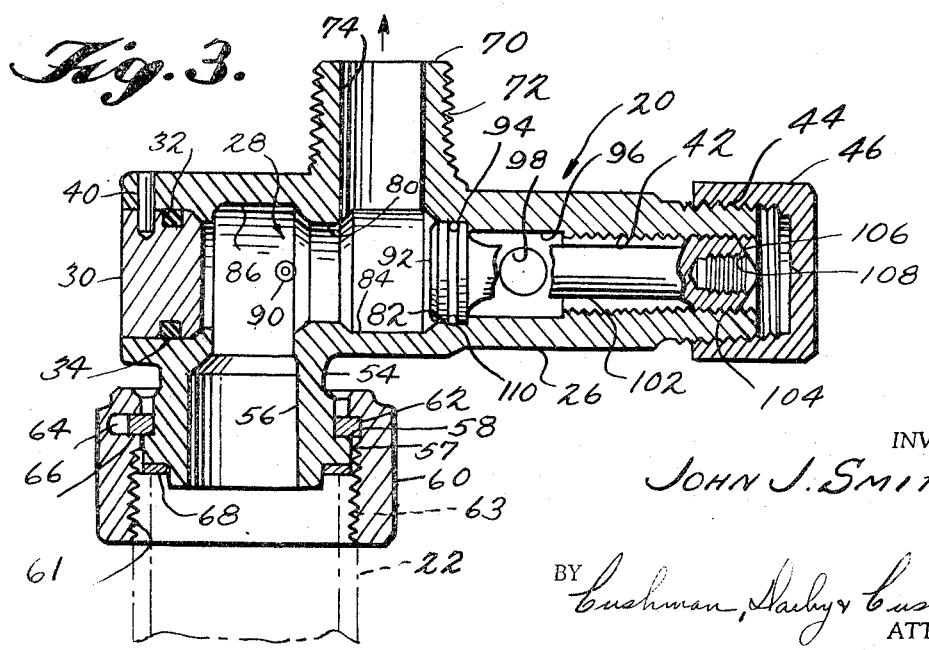
FIGURE 3 is a vertical sectional view of the improved by-pass fitting of FIGURE 2, the view looking in the direction of the arrows 3—3 of FIGURE 2.

FIGURE 4 is a sectional view, partly in elevation, and illustrating an improved tool for operating the tamper proof valve in the improved by-pass fitting of the present invention; and FIGURE 5 is a fragmentary elevational view, partly in section, illustrating the tool of FIGURE 4 connected to the improved by-pass fitting of FIGURES 2 and 3 and ready for selective operation of the tamper proof valve of the fitting.

Figure 1:
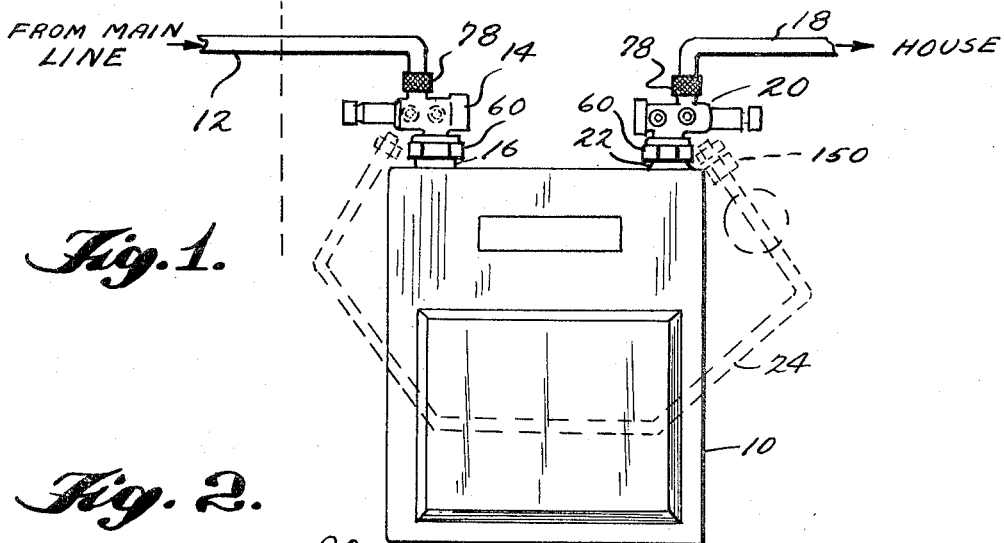
FIGURE 1 is a front elevational view of an improved meter setting of the present invention incorporating the improved by-pass fluid meter fittings in both the inlet and outlet lines of a gas meter, the view illustrating in broken lines a by-pass line or conduit for the meter setting.

Referring now to the drawings wherein like character or reference numerals represent like or similar parts, and in particular to FIGURE 1, a conventional gas meter 10 is disclosed in the improved meter setting of the present invention. In more detail, a gas supply line generally indicated at 12 extends from a suitable source of supply (not shown) and is connected to an improved fitting 14, the fitting in turn being connected to an externally threaded inlet conduit or line 16 of the fluid meter 10. A service line 18 which supplies gas to the house piping (not shown) is connected to a fitting 20 which in turn is connected to an externally threaded outlet conduit or line 22 of the fluid meter 10. The inlet fitting 14 and the outlet fitting 20 are substantially identical in construction as well as in operation and, therefore, a detailed description of one fitting will suffice for the description of the other fitting.

A by-pass line or conduit 24 shown in broken lines in FIGURE 1 is adapted to be connected to the fittings 14 and 20, respectively, when it is desired to by-pass the fluid meter 10 during servicing of the meter. A more detailed description of this operation will appear later in the specification. The inlet and outlet fittings 14 and 20, respectively, as mentioned above, are substantially identical in construction, thereby making the organization of the meter setting simplified in that it reduces considerably the number of different type parts for such a setting and also simplifies the by-pass operation because the same tool may be used to selectively operate the inlet fitting 14 and the outlet fitting 20. Referring now to FIGURES 2 and 3, the fitting 20 will now be described in detail, the description of the same sufficing for the fitting 14.

The fitting 20 for the meter 10 includes an elongated body 26 having a bore generally designated at 28 therethrough. The bore 28 is closed at one end by a tamper proof plug 30. The plug 30 is provided with an annular groove 32 which carries a sealing ring 34 for sealing contact with the wall of the bore 38. A blind pin 40 extending radially through the wall of the body 26 and into at least a portion of the plug 30 retains the plug in the end of the bore and prevents the same from being removed by unauthorized personnel once the plug is inserted. The opposite end of the bore 28 is interiorly threaded as indicated at 42, the purpose of the interior threads 42 being described later in the specification. Additionally, the body 26 is provided with exterior threads 44 on its end having the interior threads 42 and opposite the end carrying the plug 30, the exterior threads 44 being arranged to receive a closure or dust cap 46, the cap being provided with a drilling 48 for receiving a wire seal 50. Threads 44 are also arranged to receive the end of a valve operating tool 52 (FIGURES 4 and 5) as will be described in more detail later in the specification.

The elongated body 26 is provided with a laterally or radially projecting portion 54 adjacent the end of the same having the plug 30. A passageway 56 through the laterally projecting portion 54 communicates laterally with the bore 28 at its closed end and in the case of the fitting 20, provides an inlet thereto from the outlet of the fluid meter 10. On the other hand, the passageway 56 in the inlet fitting 14 acts as an outlet for the fitting 14 as will be understood more fully later in the specification. The projecting portion 54 is provided with an exterior annular ridge 57 defining a radially extending annual shoulder 58 facing the body 26 for carrying swivel nut 60. In more detail, the interiorly threaded swivel nut 60 has a diameter slightly greater than the diameter of ridge 57 and is provided with an interior annular groove 62 and a hole 64 extending from the outside of the nut 60 to the groove. The nut 60 is slipped over the external annular ridge 57 of the projecting portion 54 and then a pliable rod is forced through the hole 64 into the groove 62 to form a lock ring 66 therein which abuts shoulder 58 and retains the nut 60 on the projecting portion 54. The interior threads 61 of the swivel nut 60 are arranged to receive the exterior threads 63 of the inlet or outlets 16 and 22 depending upon which of these units the fitting is applied. A gasket 68 is provided on the end of the projection 54 for abutting the end of the inlet or outlet conduits 16 or 22 so as to make a seal therewith.

A second laterally or radially extending portion 70 is provided on the elongated body 26 of fitting 20, the portion 70 being exteriorly threaded as indicated at 72. The second laterally projecting portion 70 is provided with a passageway 74 also laterally communicating with the bore 28. It will be noted by reference to FIGURE 3 that the portion 72 is spaced longitudinally from the portion 54 on the body 26 and thus the openings of the respective passageways 74 and 56 to the bore 28 are spaced longitudinally from each other relative of the bore. Also, it will be noted that the projecting portion 72 extends in a direction substantially opposite to that of the projecting portion 54. However, if desired, the portion 72 could extend laterally or radially of the body at an angle with respective to the direction of extension of the portion 54.

The gas supply line 12 and the service line 18 are each provided with a union or swivel nut 78, the nut 78 being arranged to receive the exterior threads 72 of the portion 70 of fittings 14 and 20. The fittings 14 and 20, on the other hand, support the gas meter 10 by means of their respective swivel nut 60.

The bore 28 of the elongated body 26 is provided with a pair of longitudinally spaced cylindrical sections 80 and 82, the sections being of the same uniform diameter and axially aligned as well as separated by an enlarged bore section 84 into which the passageway 74 opens. The cylindrical section 80 further separates the enlarged bore section 84 from a second enlarged bore section 86 at the closed end of bore 28 into which the passageway 56 opens or communicates.

A laterally extending purge port 88, normally closed by a detachable closure or dust cap 90 here shown as being in the form of a threaded plug having an Allen wrench receivable socket in its outer end, is provided in the elongated body 26 adjacent the cylindrical bore section 80 in the enlarged bore section 86. The purge port 88 is provided at its inner end with a tubular pin 90 which restricts the purge port when the same is being used. Pin 90 extends far enough into bore section 86 to be in the path of movement of a spool valve 92 and thereby prevents movement of the valve past the cylindrical section 80.

The cylindrical bore section 82 at its end away from the closed end of the bore 28 is provided with an annular shoulder 94 that limits the movement of the spool valve 92 in a direction to the right of FIGURE 3. As shown in FIGURE 3, the bore 28 is provided with a reduced cylindrical section 96 between the shoulder 94 and the interior threads 42. A laterally extending by-pass port 98 communicates with the reduced cylindrical section 96 and is normally closed by a detachable closure 100 in the form of a threaded plug having a non circular socket in its outer end for the reception of an Allen wrench.

The spool valve 92 is movable longitudinally of the bore 28 between the cylindrical bore sections 80 and 82, the spool valve 92 being provided with an elongated operating stem 102 of reduced diameter. The stem 102 has its outer end exteriorly threaded as indicated at 104, the end of the stem 102 being wedge-shaped as indicated at 106. The wedge-shaped end 106 of stem 104 is defined by a pair of intersecting planar surfaces extending at an angle to a radial plane through the axis of the stem, the angle being in the order of 120° so that it is impossible for a person other than an authorized person having the tool 52 from operating the spool valve 92. The wedge-shaped end 106 is provided with an interiorly threaded closed bottom bore 108, the threaded bore 108 also co-operating with the tool 52 as will be explained in more detail later in the specification. It will now be apparent that rotation of the stem 102, by the tool 52, the spool valve 92 can be selectively advanced or retracted in the bore 28 between the cylindrical sections 80 and 82 of the bore. Also, the spool valve is provided with a circumferential groove in which is disposed an O-ring 110 for slidingly engaging the walls of the bore sections 80 and 82 to seal therewith and with the spool valve 92.

In assembling the fittings 14 and 20, the spool valve 92 and its stem 102 are inserted through the end of the body 26 before the plug 30 and pin 90 are inserted. Once the spool valve has been inserted into the bore 28 and its stem 102 threaded into the threads 42, the pin 90 is inserted into the by-pass port 88 by a press fit. Next the plug 30 is inserted into and closes the end of the bore 28, the plug being locked in position by the pin 40.

Referring now to FIGURES 4 and 5, the tool 52 for actuating the spool valve 92 is disclosed in detail. The tool 52 includes a collar 112 having an enlarged bore 114 therein interiorly threaded at its outer end as indicated at 116. The bore 114 is axially aligned with and communicates with a bore 118 of reduced diameter. The bore 118 is provided with an interior annular groove 120 for receiving an O-ring seal 122. Extending through the bores 118 and 114 and slidable with respect to the collar 112 is a tubular shaft 124. A seal is maintained between the exterior surface of the tubular shaft 124 and the wall of the bore 118 by the O-ring 122. The outer end of shaft 124 is provided with a fitting 126 which is wedge-shaped and complementary to the wedge-shaped end 106 of the stem 102 of spool valve 92. A handle 128 is fixedly secured to the other end of the shaft 124 so that the shaft can be rotated within the collar 112 as well as moved axially with respect to the collar.

A second shaft 130 is carried within the tubular shaft 124, the second shaft defining a coupling shaft for coupling the tool to the end of the stem 102 of spool valve 92. In more detail, the shaft 130 which is slightly longer than the shaft 124, extends from both ends of the tubular shaft 124 and is provided with a knob or handle 132 at its end adjacent the handle 128. The portion of the shaft 130 extending out of the fitting 126 is provided with exterior threads 134 of greater diameter than the bore through the tubular shaft 124 so that when the shaft 130 is installed within the tubular shaft 124 and its knob 122 secured thereto by suitable means, such as a pin 136, the shaft 130 cannot move axially with respect to the shaft 124, but can rotate relative thereto.

When it is desired to actuate the spool valve 92, the service man must break the seal wire 50 and remove the dust cap 46 from the fitting 20. Then the shaft 130 is threaded into the axially extending interiorly threaded bore 108 in the end 106 of the stem 102. As the shaft 130 is being threaded into the end 106 of the stem 102 by the rotation of the knob 132, the handle 128 is oriented by the service man so that the wedge-shaped end 126 of the tubular shaft 124 aligns to mate with the wedge-shaped end 106 of the stem 102. After there is mating contact of the wedge-shaped end 126 of the tubular shaft 124 and the wedge-shaped end 106 of the stem 102, the collar 112 is slid forward on shaft 124 and then threaded onto the exterior threads 44 of the body 26. When this has been accomplished, the handle 128 can be rotated relative to the collar 112 so that the stem 102 rotates on its axis and follows the threads 42 in the bore 28. This advances or retracts the spool valve 92 depending upon the direction of rotation and its initial position.

When the by-pass fittings 14 and 20 are incorporated into a meter setting such as disclosed in FIGURE 1, it will now be apparent that due to the particular arrangement of the fitting, the elongated body 26 of the same lies in a plane transverse to the axis of the inlet and outlet conduits 16 and 22. This reduces the over-all height of the connection and permits the installation of the meter 10 in a restricted or confined area. Also, by having the elongated body 26 lying in a substantially horizontal direction when installed on a meter having vertical inlet and outlet conduits, the most convenient position for actuation of the spool valve within the fitting by the tool 52 is obtained. Since the fitting of the present invention is provided with a swivel nut 60 for connecting to the inlet or outlet conduits 16 and 22 of the meter 10, it will be fully appreciated that the angle of the axis of the elongated body 26 may be adjusted to a desired angle with respect to the wall of the dwelling or building, preferably at an angle where the cap 46 on the body 26 faces outwardly away from the wall rather than substantially parallel to the wall as shown in FIGURE 1 of the drawing. The arrangement of FIG. 1 is primarily for ease in understanding the combination of the invention.

When it is desired to service the meter 10 by removing the same and it is not desired to discontinue gas service to the dwelling during such maintenance, the service man merely removes the closure 100 from the inlet fitting 14 and connects an end of the by-pass line 24 thereto. The other end of the by-pass line 24 is connected to the by-pass port 98 of the fitting 20 and a bleed valve 150 in the by-pass line is open to atmosphere so that when the tool 52 is connected to the inlet fitting 14 and the spool valve therein is actuated to a position intermediate the cylindrical bore sections 80 and 82, gas will flow through the by-pass line and to atmosphere to bleed any air from the by-pass line. Simultaneously with this operation, gas is still flowing through the meter 10. When by-pass line 24 has been bled of all air and is filled with gas, then the tool is applied to the outlet fitting 20 and the spool valve 92 therein is moved to a position where it blocks the flow of gas from the meter 10 but permits flow of gas through the by-pass line to the passageway 74 from there into the dwelling through the service line 18. Before the meter 10 is removed from the fittings 14 and 20, the service man returns to the inlet fitting 14 and actuates the valve 92 therein so that it completely blocks flow of gas to the meter but directs all flow of gas through the by-pass line 24. The meter 10 can now be removed by disconnecting it from the swivel nuts 60 of the fittings 14 and 20.

To renew service through the meter 10 after the meter has been reinstalled onto the fittings 14 and 20, the meter itself must first be purged of any air. With the spool valve 92 of the outlet fitting 20 in its position blocking flow from the meter, that is, a position where it is in sealing engagement with the bore section 80 of the body 26, the closure 90 is removed from the purge port 88. Then the spool valve 92 in the inlet fitting 14 can be moved to its intermediate position so that gas continues to flow through the by-pass line as well as starts to flow through the meter thus purging all air from the meter out of the purge port 88. When this has been accomplished, then the closure 90 is reinserted in the purge port 88 of the fitting 20 and the spool valve 92 of such fitting is moved to a position where it completely blocks flow from the purge port so that the gas flowing through the meter is the only gas entering the service line. After this has been accomplished the spool valve 92 in the inlet fitting 14 is moved from its intermediate position to a position where it blocks the flow from its by-pass port thus causing all of the gas from the supply line 12 to flow through the meter.

After the tool has been removed from the fittings and the caps reassembled thereon, it is impossible for anyone to tamper with the fittings 14 and 20 in the absence of possessing the tool 52. Even if the seal 50 is broken so that the cap 46 can be removed by unauthorized personnel, they still could not operate the spool valve 92 as a conventional tool, such as a screwdriver or the like, cannot be used to rotate the spool valve stem.

It will thus be seen that the objects of this invention have been fully and effectively accomplished by the by-pass fitting described above and illustrated in the drawings. However, it will be realized that the foregoing specific embodiments have been shown and described only for the purpose of illustrating the principles of this invention and are subject to some changes without departing from the spirit of the invention. Therefore, the terminology used throughout the specification is for the purpose of description and not limitation, the scope of the invention being defined in the claims.

What is claimed is:

1. A by-pass type fitting for use on one of an outlet conduit and an inlet conduit of a fluid meter comprising: an elongated body provided with a bore therein closed at one end thereof and open at its other end, said elongated body having a first laterally projecting portion adjacent the closed end of said bore, said laterally projecting portion having a pasageway therethrough communicating laterally with said bore and further having a swivel nut means thereon for detachably connecting the same to one of the inlet and outlet conduits, said elongated body further having a second laterally projecting portion thereon spaced longitudinally from said first laterally projecting portion, said second laterally projecting portion having a passageway therethrough communicating with said bore laterally at a location spaced longitudinally from said first-mentioned passageway, a by-pass port communicating with said bore at a location spaced longitudinally from said second mentioned passageway on a side of the same away from the first mentioned passageway, said bore having sections of the same uniform diameter on opposite sides of said second passageway; a closure for said port detachably engageable with said body; a spool valve in said bore sealingly engageable with said bore sections and selectively movable therebetween, and stem means on said spool valve threadedly engaging said bore adjacent, and accessible from the open end thereof, said stem means having an outwardly facing wedge-shaped end.

2. The structure defined in claim 1 in which said second mentioned passageway extends laterally from said bore in a direction generally opposite to a direction from which said first-mentioned passageway extends laterally from said bore.

3. The structure defined in claim 1 in which the outwardly facing wedge-shaped end of said stem means has an axial bore therein closed at one end thereof and interiorly threaded.

4. The structure defined in claim 3 including a tool for selectively moving said spool valve, said tool including a coupling shaft having its end exteriorly threaded for being threadedly received within the threaded axial bore in the end of said stem means, a tubular shaft concentric of said coupling shaft and rotatable relative thereto, said tubular shaft being provided with a wedge-shaped end for mating with the wedge-shaped end of said stem means when said coupling shaft is threaded into said axial threaded bore.

5. The structure defined in claim 1 in which said closed end of the bore in said elongated body includes a plug in said bore, and a pin extending radially through said body and at least a portion of said plug.

6. The structure defined in claim 5 in which said plug includes a sealing ring for sealingly engaging said bore.

7. The structure defined in claim 1 including a lateral purge port communicating with the bore of said elongated body adjacent said first-mentioned passageway and the end of the bore section intermediate said first and said second-mentioned passageways, a closure for said purge port detachably engageable with said body, said purge port including a tubular pin element extending inwardly of the bore in said body and providing a stop to limit movement of said spool valve in a direction toward said first passageway.

8. A by-pass type fluid meter setting comprising: an upstream fluid line, a downstream fluid line, a fluid meter having an inlet conduit and an outlet conduit, a first valve means connecting said upstream fluid line to said inlet conduit and having a body provided with a by-pass port and a removable closure for said port, said valve means being selectively operable to block flow through said meter and said by-pass port, to control flow through said meter, and to control flow through said by-pass port; a second valve means connecting said downstream fluid line to the outlet conduit of said meter, said second valve means including an elongated body provided with a bore therein closed at one end thereof and open at its other end, said elongated body having a first laterally projecting portion ajacent the closed end of said bore, said laterally projecting portion having a passageway therethrough communicating laterally with said bore and further having swivel nut means thereon detachably connecting the same to the outlet conduit of said meter, said elongated body having its axis lying in a plane transverse to the axis of the outlet conduit when connected to the same, said elongated body further having a second laterally projecting portion thereon spaced longitudinally from said first laterally projecting portion, said second laterally projecting portion having a passageway therethrough communicating with said bore in said body laterally at a location spaced longitudinally from said first-mentioned passageway, a by-pass port communicating with said bore at a location spaced longitudinally from said second-mentioned passageway on a side of the same away from said first-mentioned passageway, said bore having sections of the same uniform diameter on opposite sides of said second passageway, a closure for said port detachably engageable with said body, a spool valve in said bore of said body sealingly engageable with said bore sections and selectively movable therebetween, and a stem on said spool valve threadedly engaging said bore adjacent, and accessible from the open end thereof, said stem having means thereon for receiving a tool to rotate the same; and a by-pass line detachably connectable to and between said by-pass ports of said first and second valve means.

9. The structure defined in claim 8 in which said first valve means has an identical construction to said second valve means.

10. The structure defined in claim 8 in which said means on the end of said stem includes a wedge-shaped end having an axial bore therein closed at one end and interiorly threaded.

11. The structure defined in claim 8 in which said closed end of the bore in said body of said second valve means includes a plug in said bore, and a pin extending through said body and at least a portion of said plug.

12. The structure defined in claim 8 in which said means on the end of said stem includes a wedge-shaped end having an axial bore therein closed at one end and interiorly threaded and in which said tool cooperating with said means includes a coupling shaft having its end exteriorly threaded for being threadedly received within the threaded axial bore in the end of said stem, a tubular shaft concentric of said coupling shaft and rotatable relative thereto, said tubular shaft being provided with a wedge-shaped end for meeting with the wedge-shaped end of said stem when said coupling shaft is threaded unto said axial threaded bore, said tubular shaft having means on the same for rotating the same.

References Cited by the Examiner

FOREIGN PATENTS

| | | |
|---|---|---|
| 695,325 | 9/1964 | Canada. |
| 695,412 | 10/1964 | Canada. |
| 828,918 | 3/1952 | Germany. |

RICHARD C. QUEISSER, *Primary Examiner.*

E. D. GILHOOLY, *Assistant Examiner.*